Figures 1, 2:
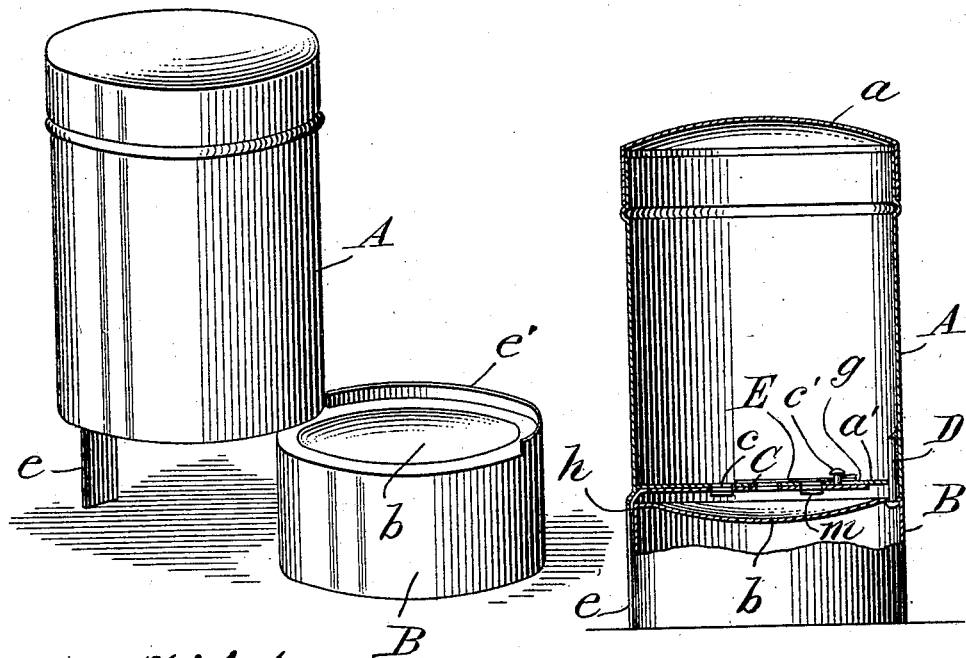

M. L. RHEIN & M. O. ANTHONY.
POWDER HOLDING AND DISPENSING CONTAINER.
APPLICATION FILED OCT. 21, 1908.

969,190.

Patented Sept. 6, 1910.
2 SHEETS—SHEET 1.

WITNESSES
H. C. Abbott
V. E. Markmann

INVENTORS
Meyer L. Rhein
Marcus O. Anthony
BY
Griffin & Bernhard
ATTORNEYS

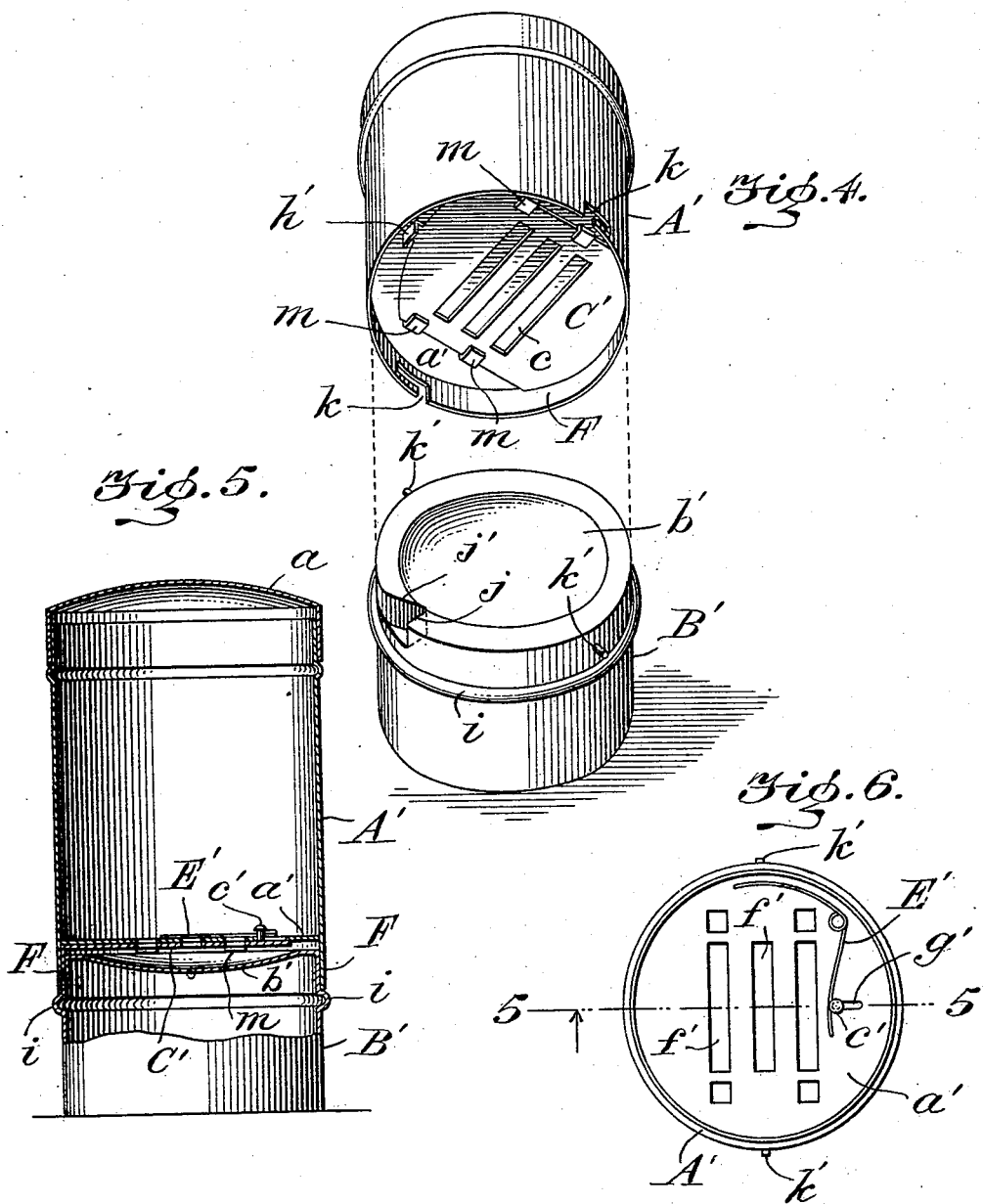

UNITED STATES PATENT OFFICE.

MEYER L. RHEIN, OF NEW YORK, N. Y., AND MARCUS O. ANTHONY, OF ENGLEWOOD, NEW JERSEY.

POWDER HOLDING AND DISPENSING CONTAINER.

969,190.

Specification of Letters Patent. Patented Sept. 6, 1910.

Application filed October 21, 1908. Serial No. 458,878.

*To all whom it may concern:*

Be it known that we, MEYER L. RHEIN and MARCUS O. ANTHONY, citizens of the United States, residing in New York, borough of Manhattan, county and State of New York, and Englewood, county of Bergen and State of New Jersey, respectively, have invented a certain new and useful Powder Holding and Dispensing Container, of which the following is a specification.

This invention is a container for powdered, granular or other loose materials, one useful purpose thereof being a receptacle for tooth powder or face powder, although it may be used for packing or storing any other loose material, particularly those materials which may be affected by exposure to the atmosphere or by evaporation or volatilization of the ingredients contained therein.

Among other things, the invention has for its objects to dispense the contents of the container in measured uniform quantities, to enable ready access to be obtained to a quantity of the contents which, upon opening the container, will be found to be delivered to an element or part of said container, and to securely inclose the material, other than the quantity for use, within said container so that the retained material will not be exposed to atmospheric influences nor subjected to evaporation, volatilization, or the absorption of moisture, the latter qualification being especially useful when hygroscopic materials are packed in the container.

The invention embodies a dispensing container comprising a reservoir, a receptacle having a chamber separate from that of the reservoir and to which chamber the contents of the reservoir are adapted to be delivered in regulated quantities, and valve mechanism adapted to be operated by turning the reservoir or the receptacle with relation one to the other, such turning movement of one of said parts being on an axis coincident with that of the reservoir. Said valve mechanism operates, when the container is opened, to cut off communication between the reservoir and the receptacle for the purpose of precluding further escape of the contents from said reservoir and for securely closing the reservoir from the admission of air, thereby protecting the material present in the reservoir, but when the container is closed by bringing the reservoir into alinement with the receptacle, then the valve mechanism is operated automatically for a limited regulated quantity of the loose material to pass from the reservoir to the receptacle, the material so discharged to the receptacle being protected from the deteriorating influence of the air by the container being closed.

In order that others may understand the invention, different practical embodiments thereof are shown in the accompanying drawings, but it will be understood that said drawings are illustrative, only, of the invention, and do not define or limit the scope thereof.

Figure 3:
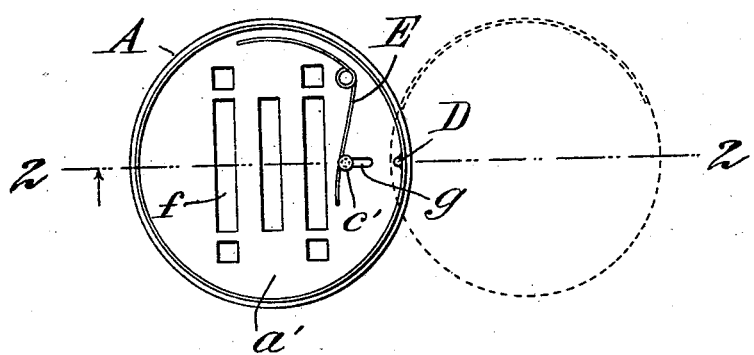

Figure 1 is a perspective view illustrating one embodiment of the container in an open position for the purpose of exposing the powder holding receptacle so that access may be obtained to the contents of said receptacle. Fig. 2 is a vertical sectional elevation of the container in a closed position, the plane of the section being indicated by the dotted lines 2—2 of Fig. 3 looking in the direction of the arrow. Fig. 3 is a plan view of the container as it appears with the cover removed, the dotted lines showing the position assumed by the powder receptacle when the container is open for use. Fig. 4 is a perspective view illustrating another embodiment of the invention wherein the reservoir and powder receptacle are adapted for detachable interlocking connection. Fig. 5 is a vertical longitudinal section through the container shown in Fig. 4 in a closed position, the plane of the section being indicated by the dotted line 5—5 of Fig. 6, and Fig. 6 is a plan view of the container shown in Figs. 4 and 5 as it appears with the cover of the reservoir removed.

The container illustrated in Figs. 1, 2, and 3 of the drawings will be first described, and thereafter the construction of Figs. 4, 5, and 6 will be set forth.

The container embodies a reservoir, A, a powder receiving receptacle, B, and a valve mechanism, C, said reservoir and receptacle being connected for movement on an axis extending in the direction of the length of the container, whereby the container when closed is adapted to open the valve mechanism and when the container is opened the valve mechanism is closed automatically.

As shown, the container, A, consists of a suitable receptacle which is provided at its top with a cover, a, and at its lower part with a bottom, a', said reservoir being of any suitable or desired capacity.

Receptacle, B, is positioned below reservoir, A, so as to serve as a base therefor, and this receptacle is provided with a transverse member, b, shown in Figs. 1 and 2 as being dished in cross section so as to serve the purposes of a tray. The particular form of member, b, of receptacle, B, however, is not material, for the reason that it may be in the form of a depression, well or pocket adapted to serve the purposes of a receptacle for a powder puff or bag, substantially as disclosed in another application filed even date herewith; and, furthermore, said member, b, may be of any other shape and capacity to suit the purposes for which the container is used.

Members, A and B, comprising the reservoir and receptacle, respectively, are connected by a hinge or pivot, D, shown in the form of a pin which is attached at its upper portion to the wall of reservoir, A, while its lower portion is connected loosely to receptacle, B, preferably in the dished tray, b, thereof, although the relative points of fixed and loose connection may be reversed by fastening said pin, D, rigidly to receptacle, B, and loosely connecting it to reservoir, A, as is obvious. Hinge or pivot, D, is positioned eccentrically to reservoir, A, and receptacle, B, preferably near the walls of said parts, A, B, but the axis of said pin, D, extends in the general direction of the axis of the container and its component parts. When the container is opened, reservoir, A, is swung on the pin, D, to the right or left of receptacle, B, thus moving reservoir, A, out of alinement with receptacle, B, although the parts remain connected by the pin, D, substantially as shown in Fig. 1. This relative adjustment exposes the top of receptacle, B, so that ready access may be obtained to the tray, b, whereby the operator may manipulate a tooth brush over receptacle, B, for the purpose of taking up powder from the tray, b.

For supporting reservoir, A, in the position of Fig. 1, it may be provided with a depending leg, e, adapted to fold compactly against one side of receptacle, B, substantially as shown in Fig. 2. If desired, receptacle, B, may be provided on one side with a substantially semicircular flange, e', adapted to extend upwardly from tray, b, and lie in the path of reservoir, A, whereby flange, e', is adapted to fit snugly against the lower part of reservoir, A, for the purpose of limiting the closing movement of said reservoir over receptacle, B.

Bottom, a', of reservoir, A, is provided with one or a plurality of openings, f, preferably in the form of slots, as shown in Fig. 3, and said bottom is provided, also, with a slot, g, the length of said slot, g, being at right angles to the slots, f.

Valve mechanism, C, embodies a plate which is fitted slidably to the under face of bottom, a', and is connected thereto so that it may have a limited sliding movement relative to said bottom. Valve plate, C, is provided with slots or openings, c, corresponding in number and size to slots, f, in bottom, a'. Said valve plate is provided with an upstanding stud or pin, c' which extends through, and is adapted to travel in, slot, g, of bottom, a'. With this upstanding pin or stud, c', engages a retracting spring, E, shown in Fig. 2 as a leaf spring secured to the upper side of bottom, a'. Spring, E, acts on stud or pin, c', to close the valve when receptacle, A, is moved relatively to receptacle, B, whereby the valve precludes material from escaping from receptacle, A, when the container is opened, and receptacle or tray, B, is thus exposed for convenient access so as to remove the powder therefrom. During the operation of closing the container, by moving receptacle, A, to occupy a position over receptacle, B, the edge of receptacle, B, acts against the spring, as hereinafter explained, to open the valve. Thus, the slots or openings, c, of the valve register with the slots, f, of bottom, a', when the container is closed, as shown in Fig. 2, thus allowing a quantity of the loose material in receptacle, A, to pass through slots, c, f, and to become deposited upon the tray, b, of receptacle, B.

Valve plate, C, is provided with means adapted to coöperate with receptacle, B, for the purpose of moving said valve plate against the action of spring, E, to a position where it will open slots, f, in bottom, a', when the container is closed by swinging reservoir, A, on the axis afforded by pin, D, so as to assume the position shown in Fig. 2. As shown, said valve plate, C, is provided at one end with a depending lip, h, which is adapted to ride against an edge portion of member, B, during the act of closing the container, and as parts, A, B, are connected eccentrically by pin, D, the edge of receptacle, B, acts as a cam on lip, h, in moving valve plate, C, to the open position of Fig. 2.

The operation of the device will be apparent from the foregoing description, and it may be summarized as follows: The reservoir, A, of container is charged or filled with loose material of any suitable nature. When the container is closed, reservoir, A, lies directly over receptacle, B, and valve plate, C, is opened by lip, h, engaging with an edge of receptacle, B, said valve being pressed to said open position against the action of spring, E. A measured quantity of loose material is adapted to pass from reservoir, A, to tray, b, of receptacle, B, said material flowing through the alined openings, c, f, in valve, C, and bottom, a', respectively. To use the material deposited on receptacle, B, the operator merely swings reservoir, A, to one side, whereupon lip, h, of valve plate, C, is withdrawn from engagement with receptacle, B, and spring, E, moves valve plate, C, to a position for closing slot, f, in bottom, a'. Valve plate, C, thus closes reservoir, A, prior to the time when said reservoir is moved substantially out of alinement with receptacle, B, thus precluding the loss and waste of the loose material. Said reservoir, A, occupies a position where the receptacle, B, is fully exposed and access is thus obtained to the material deposited on tray, b, whereby a tooth brush may be operated to take up the powder when the container is used for holding tooth powder.

In closing the container, reservoir, A, is swung back to its normal position over receptacle, B, and at this time lip, h, of valve plate, C, rides against one edge of receptacle, B, thereby moving valve plate, C, against the action of spring, E, and opening the valve for another measured quantity of loose material to pass from reservoir, A, on to tray, b, of receptacle, B.

The container shown in Figs. 1, 2, and 3 has its parts, A, B, connected permanently by the hinge or pivot pin, D, whereas in Figs. 4, 5, and 6 there is shown a construction wherein parts corresponding to the reservoir and receptacle are connected detachably by interlocking devices.

Receptacle, B', is provided with member, b', forming a dish or tray similar to the corresponding parts in the construction of Fig. 1, 2, and 3. Reservoir, A', is provided with cover, a, and slotted bottom, a', corresponding to similar parts in the construction previously described, and against the underside of said bottom is fitted valve plate, C'. Said valve plate is slotted as heretofore described, and provided with upstanding stud, e', against which works spring, E', said stud, e', working in slot, g', of bottom, a'. Receptacle, B', is provided, also, with an annular rib, i, positioned below the horizontal plane of tray, b'; and, furthermore, said receptacle, B', is provided with a notch, j, one edge of which is curved or inclined as at j' in Fig. 4 to serve as a cam for operating valve plate, C'.

Reservoir, A', is provided at its lower part with a flange, F, which depends a considerable distance below valve plate, C', and in this flange are bayonet slots, k, which are adapted to engage with studs or pins, k', of receptacle, B'.

Valve plate, C', is provided with slots, c, and a lip, h', and said valve plate is confined on bottom, a', by clips, m, the latter being formed preferably by punching out the metal of bottom, a', and bending the metal so as to produce said clips, m, as shown in Fig. 4. The clips are bent to serve as guides for valve plate, C', as well as for retaining said valve plate on said bottom.

The operation is as follows: Reservoir, A', is applied to receptacle, B', by assembling the parts for flange, F, to fit over the upper part of receptacle, B', reservoir, A', being so positioned that studs or pins, k', will enter slots, k. At the same time lip, h', of valve plate, C', enters notch, j, of receptacle, B', and the operation of placing reservoir, A', upon receptacle, B', is limited by the lower edge of flange, F, engaging with the annular rib, i. Reservoir, A', having been placed in position, one part, A' or B', is turned relative to the other part, the axis of the turning movement being the longitudinal axis of the container, and during this turning movement studs, k', enter the horizontal portions of slots, k, thereby locking parts, A', B', rigidly together. At the time one part is turned relative to the other as described, lip, h', of valve plate, C', rides against cam surface, j', the effect of which is to draw plate, C', against the tension of spring, E', thereby moving the slot, c, in valve plate into registration with slot, f', in the bottom of reservoir, A'. A quantity of loose material can thus pass from reservoir, A', upon tray of receptacle, B'. To open the container, reservoir, A', is turned in a direction for pins, k', to slip out of slots, k, and simultaneously with this turning movement lip, h', of valve plate, C', is released from the action of cam edge, j', whereupon valve plate, C', is moved to a closed position by spring, E', after which reservoir, A', may be lifted off receptacle, B', the parts, A', B', being separated so that access may be easily obtained to the tray of receptacle, B'.

From the prior description taken in connection with the drawings it will be noted that in each embodiment of the invention the parts, A, B, or A', B', are adjustable relative to each other on an axis of movement parallel to or coincident with the axis of the container; and, furthermore, the valve, C, or C', is closed when the container is opened for exposing the tray of receptacle, B or B', said valve being opened automatically by the operation of closing the container.

The automatic operation of the valve when the container is opened and closed is an important feature of the new container. By closing said valve when opening the container, the further discharge of loose material from the reservoir is precluded, and the contents of said reservoir are securely closed against the accession of air, whereby the loose material is practically sealed against deterioration of said material, the evaporation of the odor or perfume, or other ingredients, or the volatilization of the material, or the absorption of moisture, this latter qualification being especially desirable in cases where hygroscopic materials are packed in the containers. By opening the valve when the container is closed, a predetermined quantity of loose material is discharged automatically, so that the material is delivered in measured quantities. Such material, however, is not exposed to the atmosphere, for the reason that it is retained on the tray, $b$ or $b'$, and within the closed container until the latter is opened so as to expose receptacle, B or B', for access.

Having thus fully described the invention, what we claim as new, and desire to secure by Letters Patent is:

1. In a dispensing container, a reservoir, a receptacle, said reservoir and the receptacle having substantially the same cross sectional area and being relatively movable, a valve mechanism carried by and movable with the reservoir, said valve mechanism being operated by a relative movement of the reservoir to the receptacle.

2. In a dispensing container, a reservoir, a receptacle connected to said reservoir for movement relative thereto on an axis parallel to or coincident with that of said reservoir, and movable valve mechanism in the bottom of said reservoir adapted to be operated by such relative turning movement of the parts.

3. In a dispensing container, a reservoir, a receptacle movable relative thereto, and a spring-actuated valve adapted to be operated when one of said parts is turned relative to the other part.

4. In a dispensing container, a reservoir, a receptacle movable relative thereto, a valve carried by the reservoir and separate from the receptacle, and means on the valve coöperating with the receptacle whereby the valve is opened when the container is closed.

5. In a dispensing container, a reservoir, a receptacle movable relative thereto, and a spring-actuated valve carried by the reservoir and provided with means adapted to coöperate with the receptacle for opening the valve when one of the aforesaid parts is turned relative to the other of said parts.

6. In a dispensing container, two communicating chambered members connected for turning movement on an axis lengthwise of the container, one of said members having an outlet in the lower part thereof, and a spring actuated valve for establishing the communication between said chambered members, said valve operating automatically to close said outlet when one member is turned relative to the other member.

7. In a dispensing container, a reservoir and a receptacle connected for relative turning movement on an axis lengthwise of the container, a valve carried by the reservoir and movable therewith for normally closing an outlet therefrom, said valve being separate from said reservoir, and means for automatically operating the valve on a relative turning movement of the reservoir to the receptacle.

8. In a dispensing container, a reservoir having an outlet in its bottom portion, a receptacle connected with said reservoir, whereby the reservoir and the receptacle are movable relatively to each other and on an axis extending in the direction of the length of the container, a perforated valve plate movably held on the reservoir and adapted to open and close the outlet in the bottom thereof, and a spring for moving said valve plate to a position for closing said outlet.

9. In a dispensing container, a reservoir having an outlet in its bottom portion, a receptacle connected with said reservoir, whereby the reservoir and the receptacle are movable relatively to each other and on an axis extending in the direction of the length of the container, a slidable valve movable upon the bottom of the reservoir and adapted to open and close the outlet in said reservoir, means for retaining said valve in a position to open said outlet, and means for shifting the valve to a position for closing the outlet upon opening the container.

In testimony whereof we have signed our names to this specification in the presence of two subscribing witnesses.

MEYER L. RHEIN.
MARCUS O. ANTHONY.

Witnesses:
H. I. BERNHARD,
M. C. POWELL.